April 14, 1925.
G. W. NEWMAN
APPARATUS AND PROCESS FOR ELECTROPLATING METAL AND FORMING
ARTICLES THEREFROM
Filed July 20, 1923
1,533,447
7 Sheets-Sheet 1
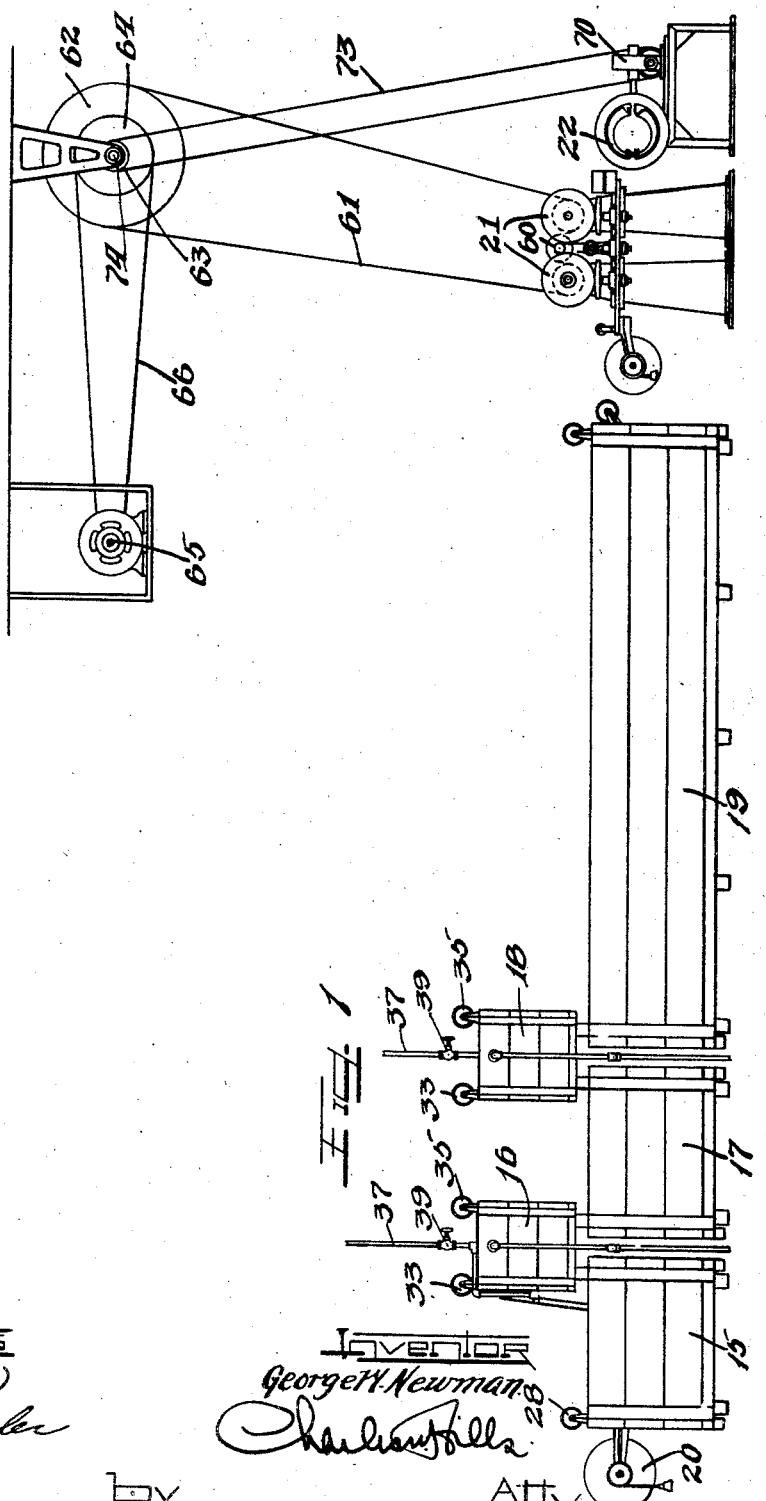

April 14, 1925.
G. W. NEWMAN
APPARATUS AND PROCESS FOR ELECTROPLATING METAL AND FORMING
ARTICLES THEREFROM
Filed July 20, 1923  7 Sheets-Sheet 2
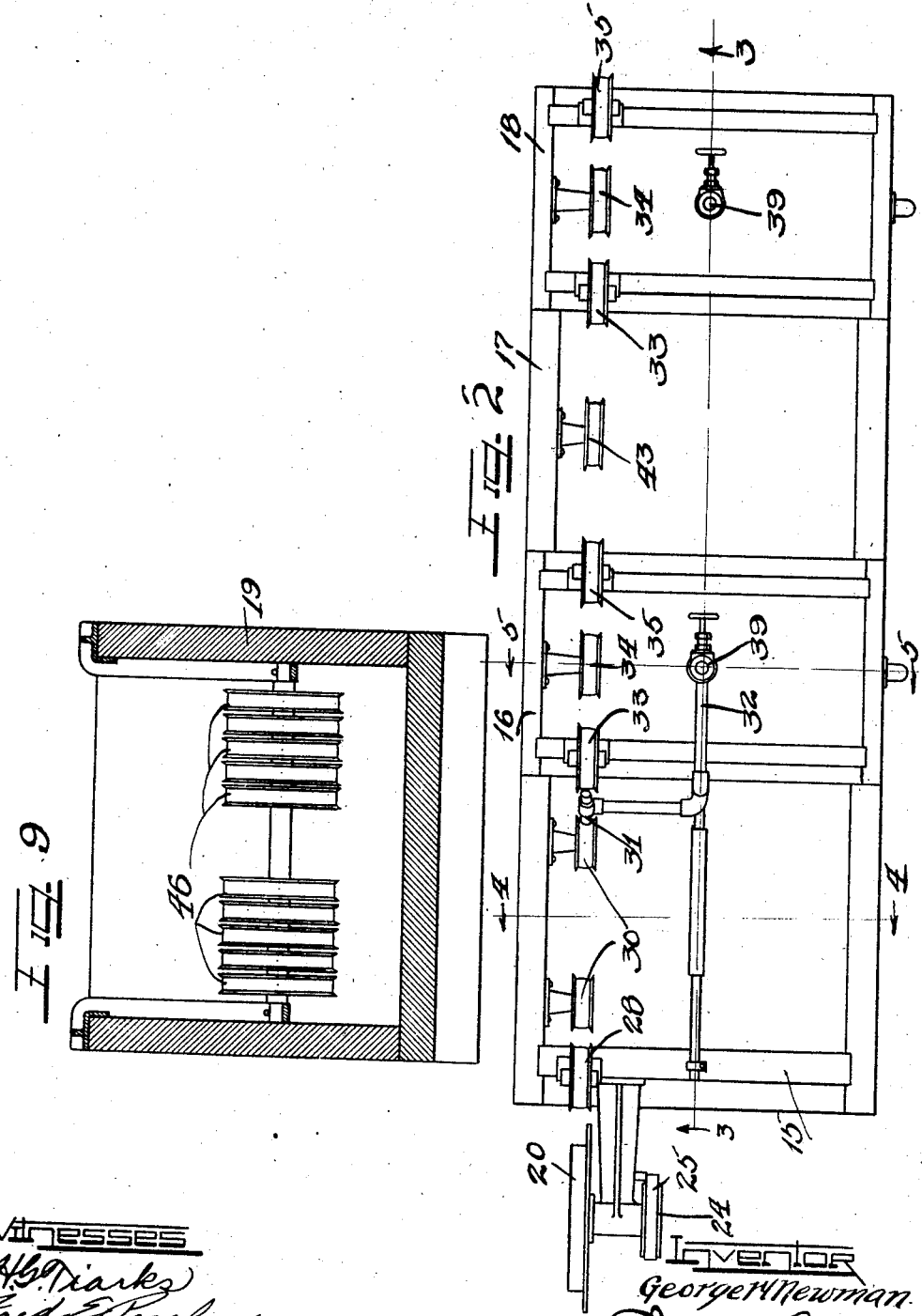

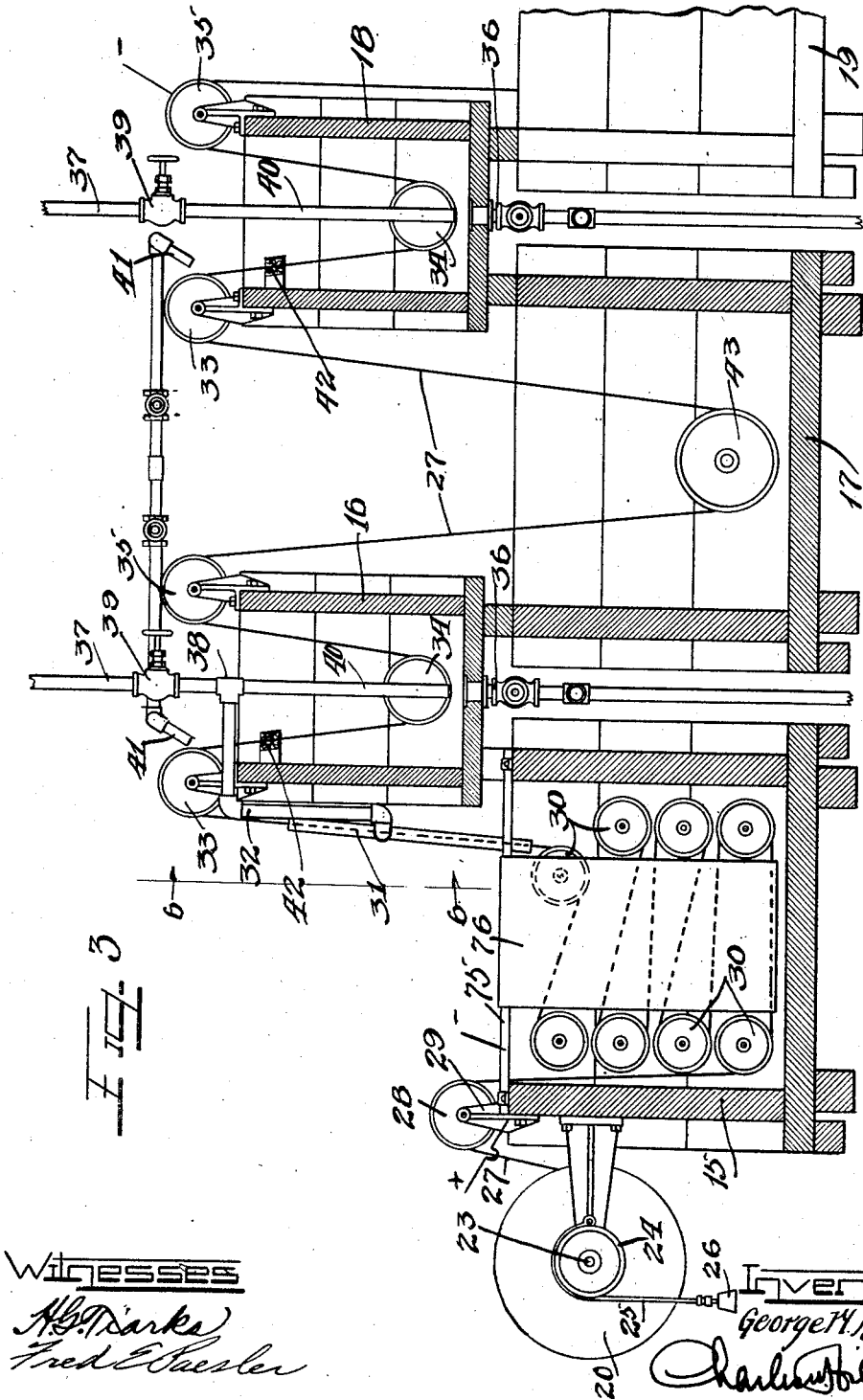

April 14, 1925.  1,533,447
G. W. NEWMAN
APPARATUS AND PROCESS FOR ELECTROPLATING METAL AND FORMING
ARTICLES THEREFROM
Filed July 20, 1923    7 Sheets-Sheet 4
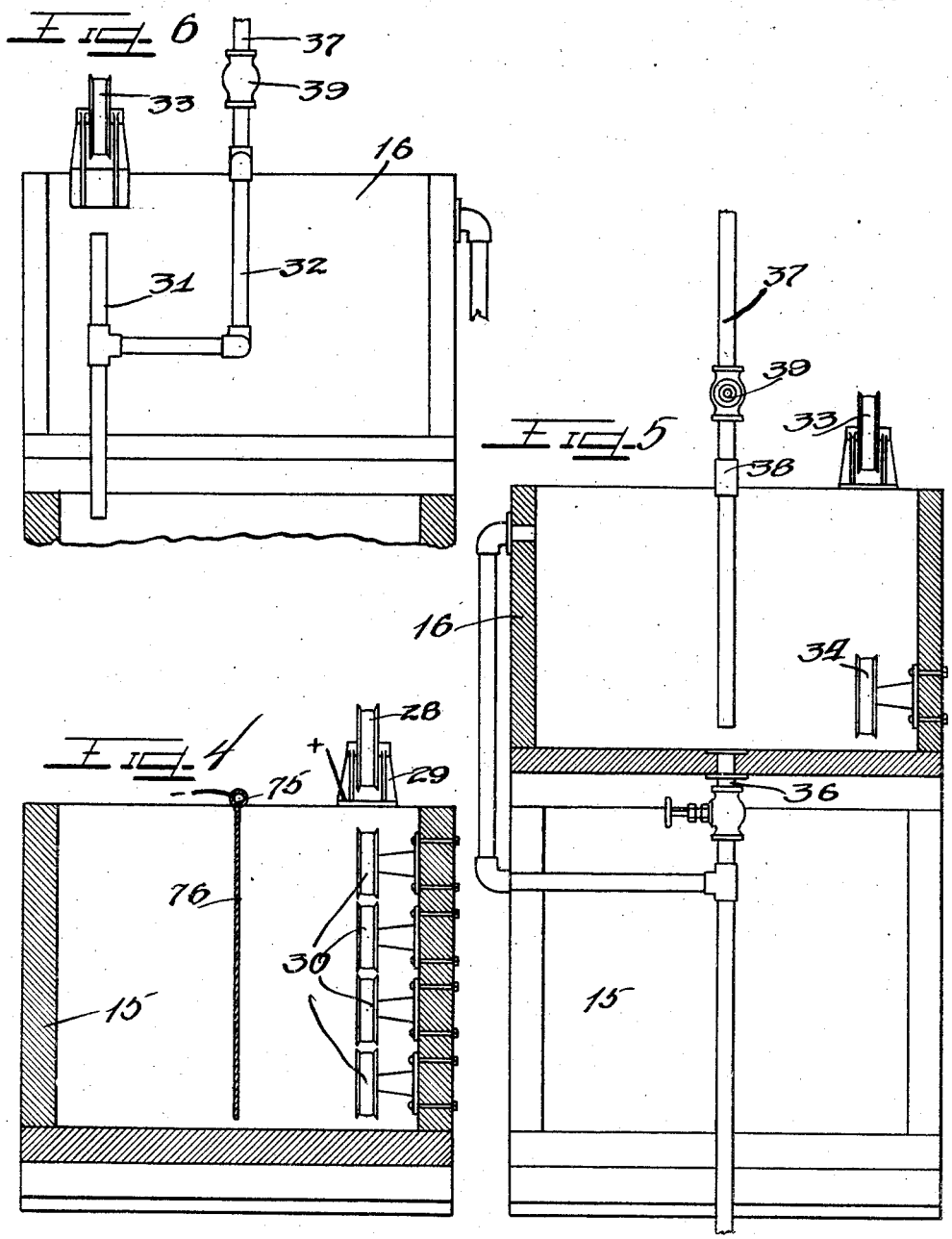

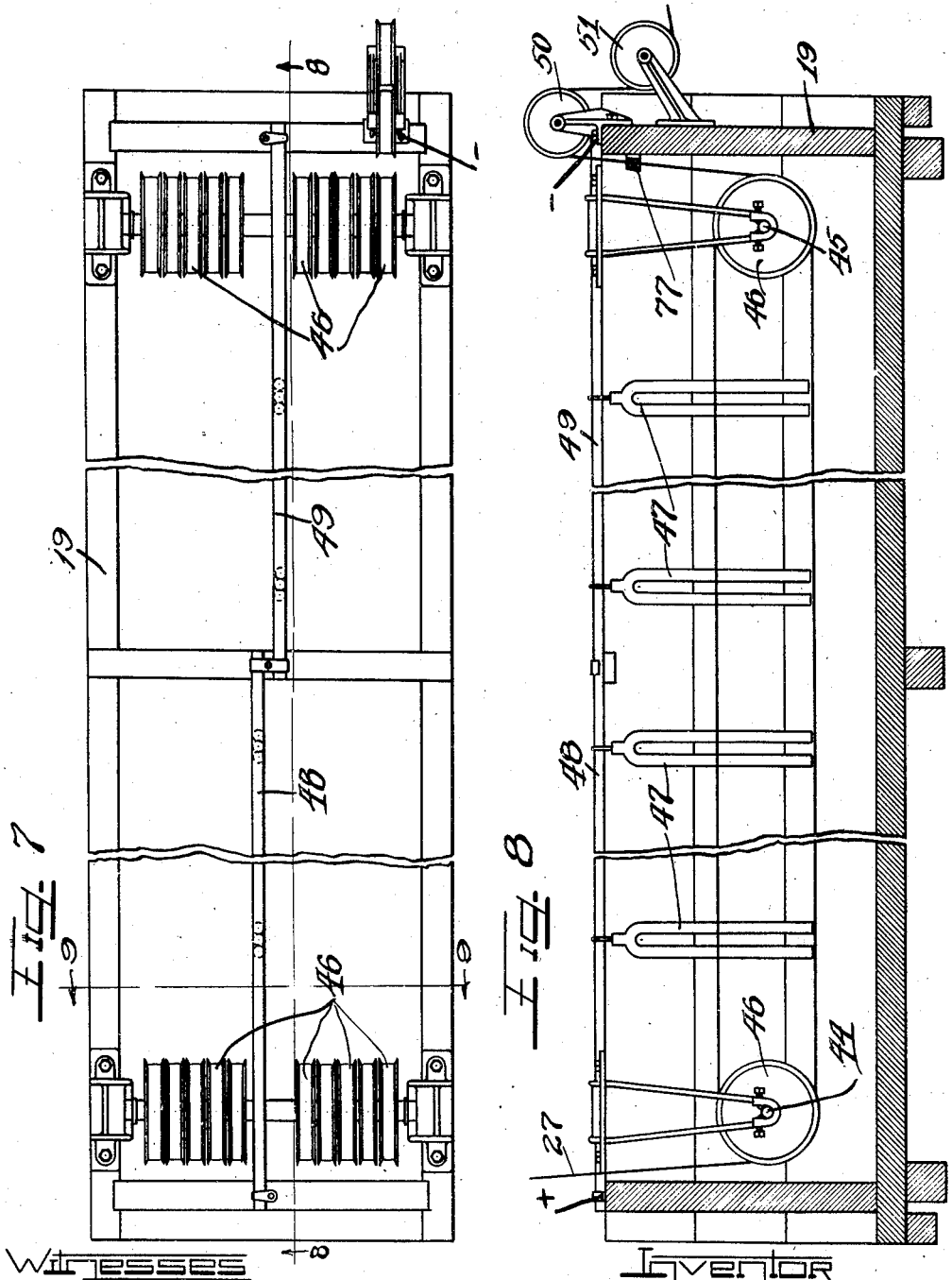

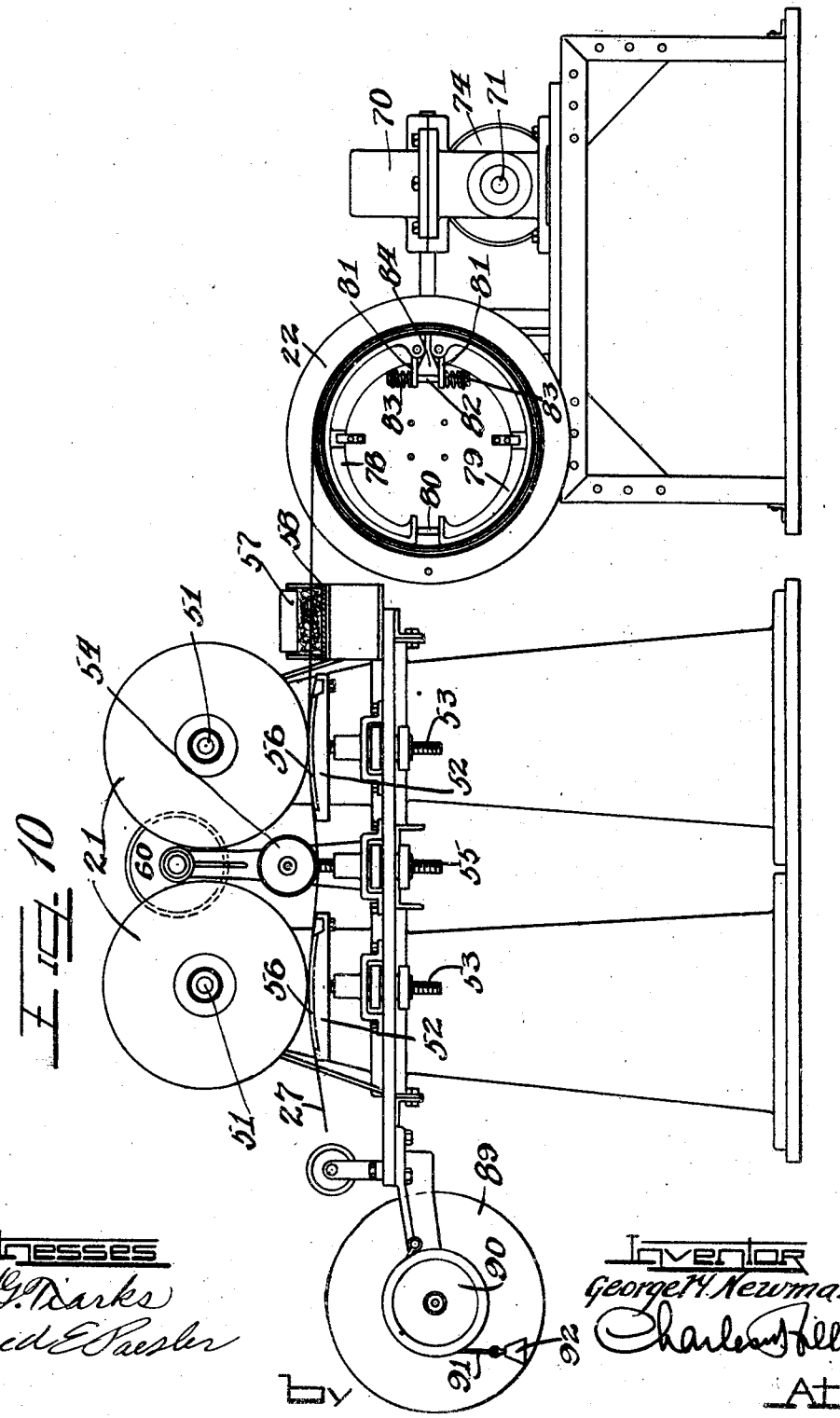

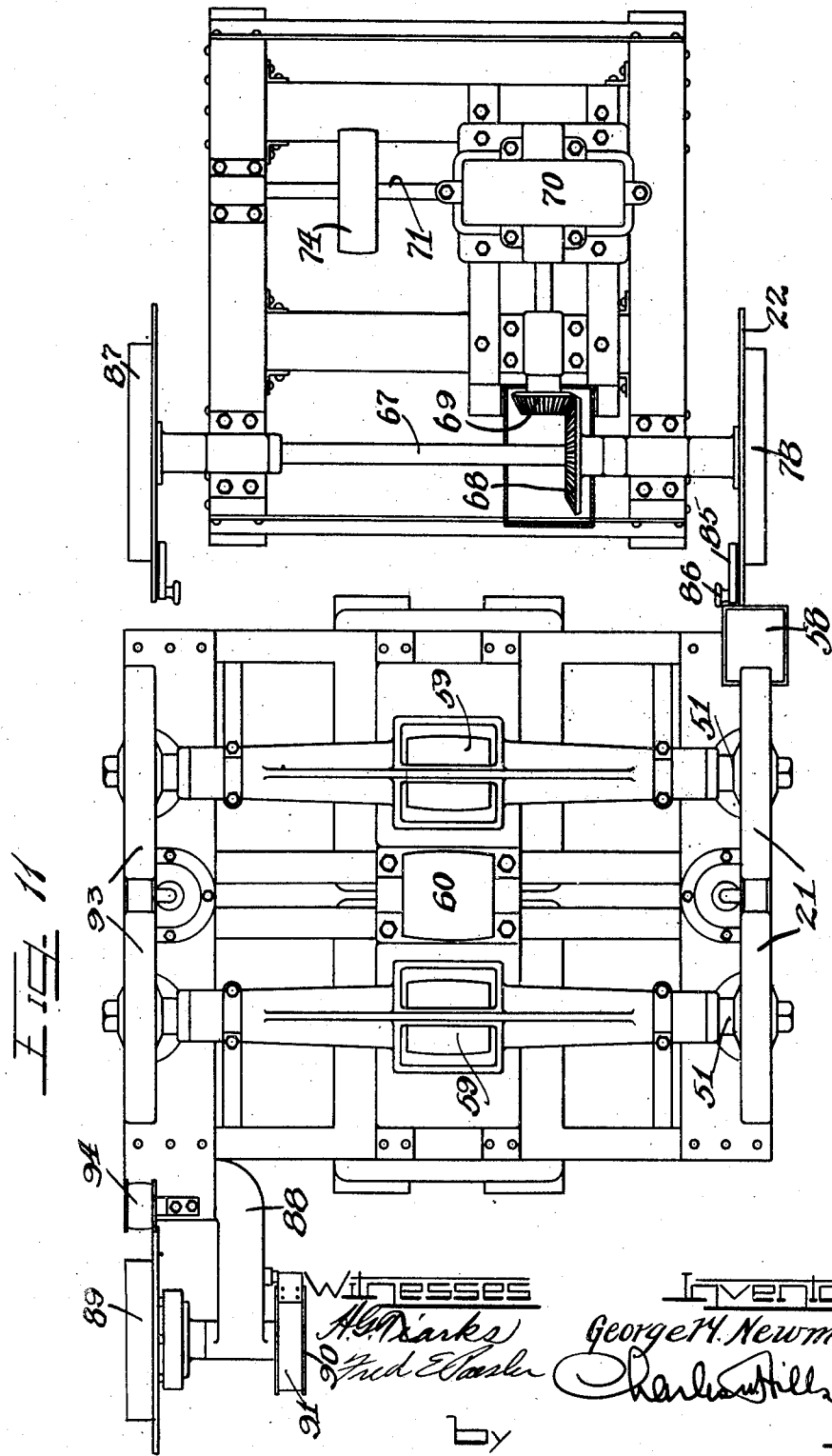

Patented Apr. 14, 1925.

1,533,447

UNITED STATES PATENT OFFICE.

GEORGE W. NEWMAN, OF CHICAGO, ILLINOIS, ASSIGNOR, BY MESNE ASSIGNMENTS, TO WILSON-JONES LOOSE LEAF COMPANY, OF CHICAGO, ILLINOIS, A CORPORATION OF MASSACHUSETTS.

APPARATUS AND PROCESS FOR ELECTROPLATING METAL AND FORMING ARTICLES THEREFROM.

Application filed July 20, 1923. Serial No. 652,747.

*To all whom it may concern:*

Be it known that I, GEORGE W. NEWMAN, a citizen of the United States, and a resident of the city of Chicago, in the county of Cook and State of Illinois, have invented certain new and useful Improvements in an Apparatus and Process for Electroplating Metal and Forming Articles Therefrom; and I do hereby declare that the following is a full, clear, and exact description of the same, reference being had to the accompanying drawings, and to the numerals of reference marked thereon, which form a part of this specification.

This invention relates to an apparatus and process for electroplating metal, more particularly endless strips of metal, and forming articles therefrom.

Many articles are made of pressed steel electroplated with nickel and heretofore it has been customary to press the steel into the desired shape and then plate each article separately by suspending it in an electrolyzing tank. This involves a very large amount of labor and trouble.

If a strip of steel is plated with nickel by the usual apparatus and methods and then pressed into shape the nickel plating is apt to crack and peel off where the steel is bent.

One of the principal objects of the invention is to provide a plating apparatus by which a nickel or other coating may be applied to a strip so firmly and strongly that the strip may afterwards be folded and bent into any desired shape without cracking off the plating.

The main feature of the invention is to provide an apparatus and process in which the steel strip is first thoroly cleansed and then kept wet until it enters the nickel plating tank. When these precautions are taken the strip is plated so firmly that it may be bent and formed into almost any shape without cracking off the adhering layer of nickel.

It has been found that not only is it unnecessary to plate the steel with copper preparatory to plating with nickel but further in some cases it seems to be even disadvantageous as the copper layer yields and slips under die forming operations more readily than the nickel.

Other and further important objects of this invention will be apparent from the disclosures in the accompanying drawings and specification.

The invention (in a preferred form) is illustrated in the drawings and hereinafter more fully described.

On the drawings—

Figure 1 is a side elevation of the plant as a whole.

Figure 2 is a plan view of the potash, pickling and hot water tanks.

Figure 3 is a section on the line 3—3 of Figure 2.

Figure 4 is a section on the line A—A of Figure 2.

Figure 5 is a section on the line 5—5 of Figure 2.

Figure 6 is a view taken on the line 6—6 of Figure 3.

Figure 7 is a plan view of the nickel tank.

Figure 8 is a section on the line 8—8 of Figure 7.

Figure 9 is a section on the line 9—9 of Figure 7.

Figure 10 is a side elevation of the buffing and winding mechanism.

Figure 11 is a plan view of the same.

As shown on the drawings—

The electroplating apparatus includes a caustic alkali or potash tank 15 for cleaning the strip of metal, a hot water tank 16 for removing the potash, a pickling tank 17, a hot water tank 18 for removing the pickling solution and a nickel plating tank 19. The strip of steel 27 to be plated is wound on a drum 20. It is passed from this drum through the tanks, past buffing wheels 21 to a winding drum 22.

The potash tank contains a solution of caustic potash, say 5 to 10% KOH, to remove any grease which may be adhering to the surface of the strip.

The pickling tank contains a strong solution of the cyanide of sodium, (say 18 Baumé) or potassium or hydrochloric acid (50—50 acid and water).

The nickel plating tank contains a solution of about 7 or 8% nickel ammonium sulphate. The cleansing of the steel strip by the caustic alkali is aided by electrolysis; the steel strip being electrically connected to the positive terminal and an iron plate dipped into the solution being connected to the negative terminal of a low potential, high amperage generator or battery.

The nickel plating is carried out by another generator or battery having its negative terminal electrically connected to the steel strip while the positive terminal is connected to a series of nickel bars suspended in the tank.

It will be noted, therefore, that in one tank the steel strip acts as a positive electrode and in another tank as a negative electrode.

The drum 20 is mounted on a shaft 23 provided with a brake-drum 24 around which extends a strap 25 with a weight 26 attached thereto. This braking device aids in keeping the strip 27, taut in its passage through the apparatus. The strip as it leaves the drum 20, passes over a pulley 28 mounted in a bracket 29, secured to the upper edge of the potash tank 15. Within the potash tank are arranged a series of pulley wheels 30 around which the strip is wound as shown in Figure 3. Suspended in the tank 15 by a rod 75 is an iron plate 76. This rod and plate are electrically connected to the negative terminal of a suitable low voltage generator, battery or other source of direct current while the bracket 29, which carries the pulley 28 over which the strip 27 passes, is electrically connected to the positive terminal of such generator or the like. The alkali saponifies any grease which may be on the strip and the electrolysis results in the removal of a thin surface film of metal from the steel strip.

Leaving the alkali tank the strip passes through a tube 31 supplied with steam by a pipe 32. The steam partially condenses on the cold strip of steel and the water so produced runs down the strip carrying with it the greater part of the adhering alkali solution.

The strip then passes over pulley 33 into the water tank 16, around pulley 34 and out again over pulley 35. As the strip passes downwardly from the pulley 33 it is further cleansed by a jet of water from a pipe 41 and by passing it between a pair of scrubbing brushes or pads 42. This tank is provided with a water pipe 36 by which it may be filled. For heating the water, a steam connection 37 connected by a valve 39 and a T-connection 38 to the steam pipe 32 above referred to and also to a pipe 40 whose lower end is below the level of the water in the tank.

Leaving the hot water tank 16, the strip enters the pickling tank 17, passes around pulley 43 and then moves upward to a second hot-water tank 18. The latter is constructed like tank 16 above described except that there is no provision for cleansing the strip by steam as it leaves the pickling tank.

The pickling tank is adapted to remove any trace of oxide formed by the electrolytic action in the alkali tank. Cyanides and acid, such as hydrochloric acid are adapted to perform this function.

The nickel plating tank is shown in detail in Figures 7, 8 and 9. Adjacent the ends of the tank are shafts 44 and 45 on each of which are mounted two sets of five pulleys 46. The strip 27 is wound around these pulleys as shown in Figure 7. As the strip moves forward through the series of tanks with uniform speed the variation in time required for each operation must be accomplished by varying the length of strip immersed at any one time. As the nickel plating operation is the slowest, the tank for that purpose is made so as to hold a greater length of strip than any of the others.

The pulleys 46 are arranged in two sets to leave a space down the center of the tank for a series of anodes 47 suspended by bars 48 and 49. These bars are offset where they overlap in the middle of the tank so as to give more clearance between the anodes and that portion of the strip extending obliquely across the tank at that point.

The necessary current for the plating operation is made by connections to either or preferably to both pulleys 35 and 50 at each end of the tank to the negative terminal of a suitable low potential, high amperage generator or battery. These pulleys are made of metal so that they conduct the current to the strip which passes over them. The pulleys 46 in the tank are made of insulating material such as glass and the brackets which support the pulleys 35 and 50 are insulated from the contents of the plating tank so that the whole current must flow through the solution from the anodes 47 to the steel strip 27. The bar 48 which supports the anodes is also insulated from the contents of the tank except through the anodes themselves.

The strip as it leaves the nickel plating tank 19 passes between a pair of pads 77 to remove the excess solution adhering to the strip then, over pulley 50, under pulley 51 to the polishing mechanism. This includes a pair of buffing wheels 21 mounted on shafts 51. The strip is held in contact with these wheels by means of curved blocks 52 adjustably supported by means of threaded rods 53. An idler pulley 54 adjustably mounted on a threaded rod 55 is provided for drawing down the strip between the two blocks 52. A pad 56 of felt carpet or the like may, if desired, be inserted in a recess in the upper surface of each curved block.

As the strip leaves the buffing wheels it passes through a box 58 containing felt or other fibrous material both above and below the strip pressed into contact with the latter by means of a weight 57. On the shafts 51 are arranged pulleys 59 and between them an idler pulley 60. A driving belt 61 passes under pulleys 59 and over pulley 60. This belt is driven by a pulley 62 on a shaft 63 which also carries a pulley 64. The latter is in turn driven by an electric motor 65 by a belt 66.

The winding drum 22 which receives the strip 27 as it comes from the buffing wheels 21 is mounted on a shaft 67. The latter carries a bevel gear 68 driven by a bevel pinion 69 which in turn is driven by worm reduction gear 70 from a shaft 71. A pulley 72 on this shaft is connected by a belt 73 to a pulley 74 on the shaft 63.

To facilitate removal of the strip from the winding drum 22 this is made expansible and collapsible. For this purpose the part which carries the strip is made in two segments 78 and 79, flexibly connected at 80 on one side of the drum. On the other side of the drum projections 81 are formed on or connected with the segments and apertured for the passage of a bolt 82. Springs 83 are arranged on this bolt on either side of the projections 81 tending to draw the latter together and thereby collapse the drum. This action is prevented by an adjustable wedge member 84 which is connected to a plate 85 carrying a set-screw 86 by which it may be locked in any desired adjusted position. Before winding, the drum is expanded by drawing outwardly this wedge member and locking it in such position. After winding, the set-screw is loosened and the drum is collapsed.

At the same time that one strip is being drawn through the apparatus, another strip is being polished and cleaned preparatory to being put through the plating machine.

For this purpose another winding drum 87 similar to the winding drum 22 is placed on the opposite end of the shaft 67 which carries the latter. Secured to the frame which supports the polishing mechanism is a bracket 88 which carries a strip supporting drum 89. The rotation of this drum is checked by a brake drum 90, strap 91 and weight 92, in a similar manner to drum 20. The strip of steel from this drum 89 is carried over a pair of supports similar to the supports 52 which hold it in contact with buffing wheels 93 on the same shafts 51 as carry the buffing wheels 21. A guide pulley 94 is preferably interposed between the drum 89 and the buffing wheels 93.

After the strips have been plated and polished they are cut into lengths and pressed into the desired shape. As any form of press may be used for this purpose no description thereof is given.

I am aware that numerous details of construction may be varied through a wide range without departing from the principles of this invention, and I therefore do not purpose limiting the patent granted, otherwise than necessitated by the prior art.

I claim as my invention—

1. The method of treating metal, which consists in first subjecting the same to an electrolytic bath to cleanse the same and to remove a portion of the surface thereof, and then plating said surface.

2. The method of treating metal, which consists in first subjecting the same to an electrolytic bath to cleanse the same and to remove a portion of the surface thereof, then plating said surface, and finally stamping said plated metal to a desired configuration.

3. The method of treating a strip of metal, which consists in subjecting said strip successively to an electrolytic bath to cleanse the same and to remove a portion of the surface thereof, and to a plating bath, the two operations occurring simultaneously upon different portions of said strip.

4. The method of treating a strip of metal, which consists in subjecting said strip successively to an electrolytic bath to cleanse the same and to remove a portion of the surface thereof, and to a plating bath, the two operations occurring simultaneously upon different portions of said strip, then cutting the strip into lengths, and finally pressing said lengths into the form desired.

In testimony whereof I have hereunto subscribed my name in the presence of two subscribing witnesses.

GEORGE W. NEWMAN.

Witnesses:
A. W. SEVERANCE,
ROBERT FOREMAN.